United States Patent
Shimada et al.

(10) Patent No.: US 6,298,279 B1
(45) Date of Patent: Oct. 2, 2001

(54) CAD/CAM APPARATUS AND MACHINING APPARATUS FOR PROCESSING POSITION/FORCE INFORMATION

(75) Inventors: Akira Shimada; Hideshi Kamiya; Yoshinobu Ohtachi; Hiroyuki Makinoshima; Hiroyuki Sakamaki, all of Narashino (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 09/067,850

(22) Filed: Apr. 27, 1998

(30) Foreign Application Priority Data

Apr. 28, 1997 (JP) .................................... 9-124932
Oct. 24, 1997 (JP) .................................... 9-309743

(51) Int. Cl.[7] .................................... G06F 19/00
(52) U.S. Cl. .................... 700/182; 700/187; 700/188; 700/177; 700/185
(58) Field of Search ............... 700/182, 70, 187, 700/185, 188, 177, 193, 194, 195

(56) References Cited

U.S. PATENT DOCUMENTS

| | | | |
|---|---|---|---|
| 4,393,449 | * 7/1983 | Takeda et al. | 364/474.27 |
| 4,901,253 | * 2/1990 | Iwano et al. | 345/419 |
| 5,005,135 | * 4/1991 | Morser et al. | 364/474.35 |
| 5,198,984 | * 3/1993 | Yamaguchi et al. | 364/474.3 |
| 5,419,222 | * 5/1995 | Bleg | 82/1.11 |
| 5,485,399 | * 1/1996 | Saigo et al. | 364/525 |
| 5,556,554 | * 9/1996 | Morishita | 219/69.12 |
| 5,761,390 | * 6/1998 | Koshishiba et al. | 395/85 |

OTHER PUBLICATIONS

Application of Intelligent CNC in Grinding, Computers In Industry, NL, Elsevier Science Publishers, Amsterdam, vol. 31, No.1, Oct. 30, 1996, pp. 45–60.
Process Modeling and Formulation for the Development of an Intelligent Set–Up Planning System, Proceeding of The Institution of Mechanical Engineers, Journal of Engineering Manufacture, vol. 209, No. B1, 1995, pp. 455–467.

* cited by examiner

Primary Examiner—Ayaz Sheikh
Assistant Examiner—Firmin Backer
(74) Attorney, Agent, or Firm—Adams & Wilks (57) ABSTRACT

A modeling operation of a shape of a work (3) is performed by a CAD (1). A tool path calculation section (15) calculates path data having, as an attribute, position and force information by a fuzzy inference or the like by shape information, machining information and machined surface information. A machining program is produced on the basis of the path data in a machining program producing section (17). Orbit data for every renewal cycle Tm concerning the position, posture, force and moment are calculated in a position and/or force operation planning section (19) and a position and/or force orbit producing section (21). Then, a simultaneous feedback control is performed for the position and the frictional force in a controlling section (23).

22 Claims, 11 Drawing Sheets

(a) CURRENT SURFACE ROUGHNESS
 − TARGET SURFACE ROUGHNESS (b) GROUND SURFACE AREA (c) GRINDING ENERGY

(a) ASSUME FUNCTION $t = 0 \sim t_a$
$F_1(t) = a_0 + a_1 t + a_2 t^2 + a_3 t^3 + a_4 t^4 + a_5 t^5$
$\dot{F}_1(t) = a_1 + 2a_2 t + 3a_3 t^2 + 4a_4 t^3 + 5a_5 t^4$
$\ddot{F}_1(t) = 2a_2 + 6a_3 t + 12a_4 t^2 + 20a_5 t^3$ (b) GIVE RESTRICTIVE CONDITIONS $F_1(0) = a_0$
$F_1(t_a) = a_0 + a_1 t_a + a_2 t_a^2 + a_3 t_a^3 + a_4 t_a^4 + a_5 t_a^5$
$\dot{F}_1(0) = a_1$
$\dot{F}_1(t_a) = a_1 + 2a_2 t_a + 3a_3 t_a^2 + 4a_4 t_a^3 + 5a_5 t_a^4$
$\ddot{F}_1(0) = 2a_2$
$\ddot{F}_1(t_a) = 2a_2 + 6a_3 t_a + 12a_4 t_a^2 + 20a_5 t_a^3$ (c) SEEK COEFFICIENTS (=DETERMINE TARGET ORBIT FUNCTION)

$F_1(t) = a_0 + a_1 t + a_2 t^2 + a_3 t^3 + a_4 t^4 + a_5 t^5$
$a_0 = F_1(0)$, $a_1 = \dot{F}_1(0)$, $a_2 = \ddot{F}_1(0)/2$
$a_3 = \dfrac{20 F_1(t_a) - 20 F_1(0) - (8\dot{F}_1(t_a) + 12\dot{F}_1(0)) t_a - (3\ddot{F}_1(0) - \ddot{F}_1(t_a)) t_a^2}{2 t_a^3}$
$a_4 = \dfrac{30 F_1(0) - 30 F_1(t_a) + (14\dot{F}_1(t_a) + 16\dot{F}_1(0)) t_a + (3\ddot{F}_1(0) - 2\ddot{F}_1(t_a)) t_a^2}{2 t_a^4}$
$a_5 = \dfrac{12 F_1(t_a) - 12 F_1(0) - (6\dot{F}_1(t_a) + 6\dot{F}_1(0)) t_a - (\ddot{F}_1(0) - \ddot{F}_1(t_a)) t_a^2}{2 t_a^5}$

OBJECT TO BE CONTROLLED

CAD/CAM APPARATUS AND MACHINING APPARATUS FOR PROCESSING POSITION/FORCE INFORMATION

BACKGROUND OF THE INVENTION

The present invention relates to a CAD/CAM apparatus and a machining apparatus in consideration of force information, and more particularly to a CAD/CAM apparatus and a machining apparatus in which path data having position and force information or energy as attributes are calculated in accordance with a predetermined algorithm on the basis of shape information, machining information and machined surface information of a workpiece to thereby perform force control in addition to positional control so that high quality and stable shape precision and surface roughness may be obtained.

Figure 9:
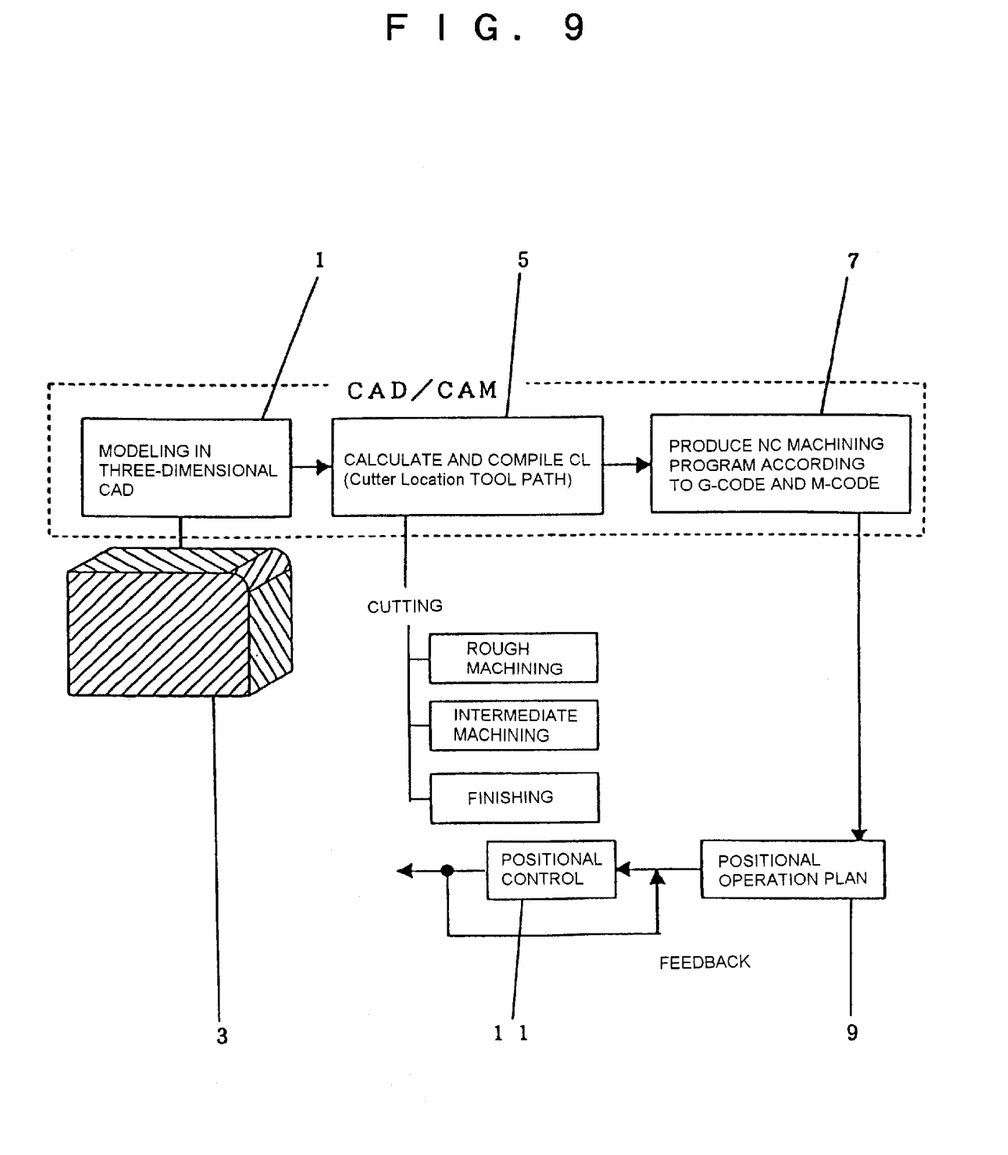
FIG. 9 is an overall structural view showing a conventional CAM system.

FIG. 9 shows a conventional CAM system. A shape of a workpiece 3 is modeled by a CAD 1. At this time, in order to produce a machining program, the operation of producing surface information (recognizing the portions surrounded by lines as surfaces) or producing coupling information of surfaces is performed together by the CAM. Then, on the basis of the shape modeling data, parameters such as a machining starting point, an approach velocity, a pitch amount, a removal allowance, a tool to be used or the like (hereinafter referred to as machining information) are supplied to a tool path calculation section 5 to perform the calculation and the compilation of the path. These operations are performed for every machining step (rough machining, intermediate machining and finishing). It is however possible to compile a plurality of machining steps as continuous data. Then, an NC machining program (G-code, M-code) is automatically produced in a program producing section 7 in accordance with the path data calculated in the tool path calculation section 5. Since this program is output as a text file, it is possible to compile it by use of an editor. Subsequently, in accordance with the NC machining program produced in the program producing section 7, the establishment of target values for the positional and velocity control of the tool or the replacement of the tools are performed in a position/motion planning section 9, and the workpiece 3 is automatically machined in a positional control section 11. Since the conventional CAM system handles only positional (and velocity) information, the system is suitable for cutting work (or grinding work) requiring high shape precision. As a matter of fact, almost all CAM systems are used for cutting type machining.

Figure 10:
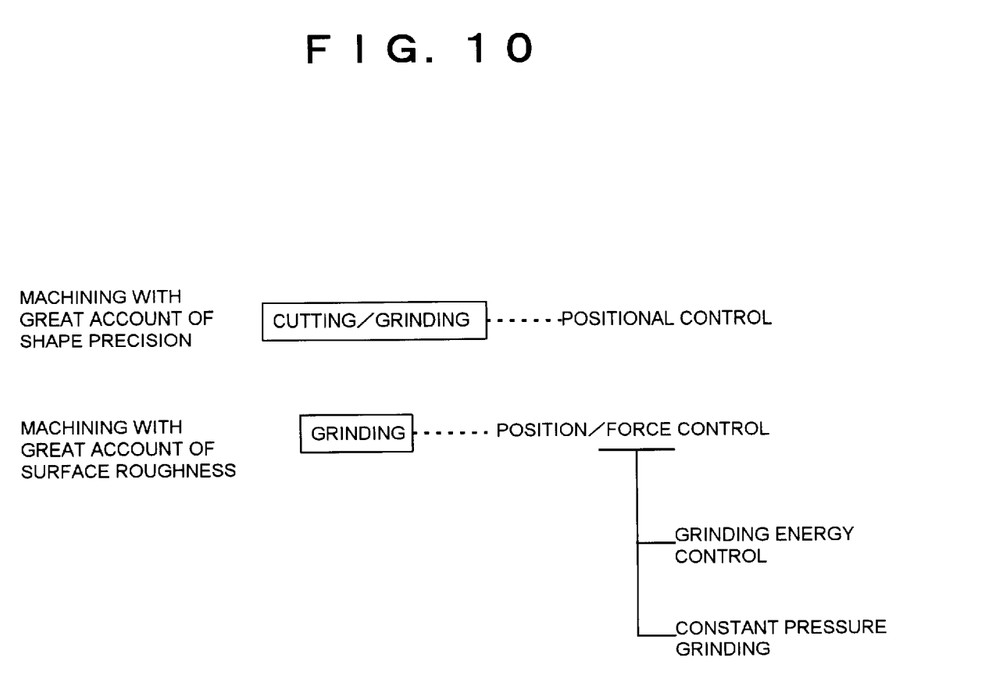
FIG. 10 is a view illustrating a difference of the controls by machining.

However, it is necessary to identify the surface roughness with a target value when performing grinding work (or cutting work for the purpose of finishing) as shown in FIG. 10. Accordingly, force control is needed in addition to the positional control. Accordingly, the conventional CAM system which does not provide for force control, is not suitable for the grinding type machining, and it is difficult to automatically perform such an operation. Also, this becomes one of the factors that makes it difficult to automatically perform an operation such as grinding machining.

Furthermore, even in the case where force control is handled by the CAM system and it is applied to the actual grinding robot to perform the grinding work, in order to realize a high quality grinding surface, the system suffers from the following defects.

Figure 11:
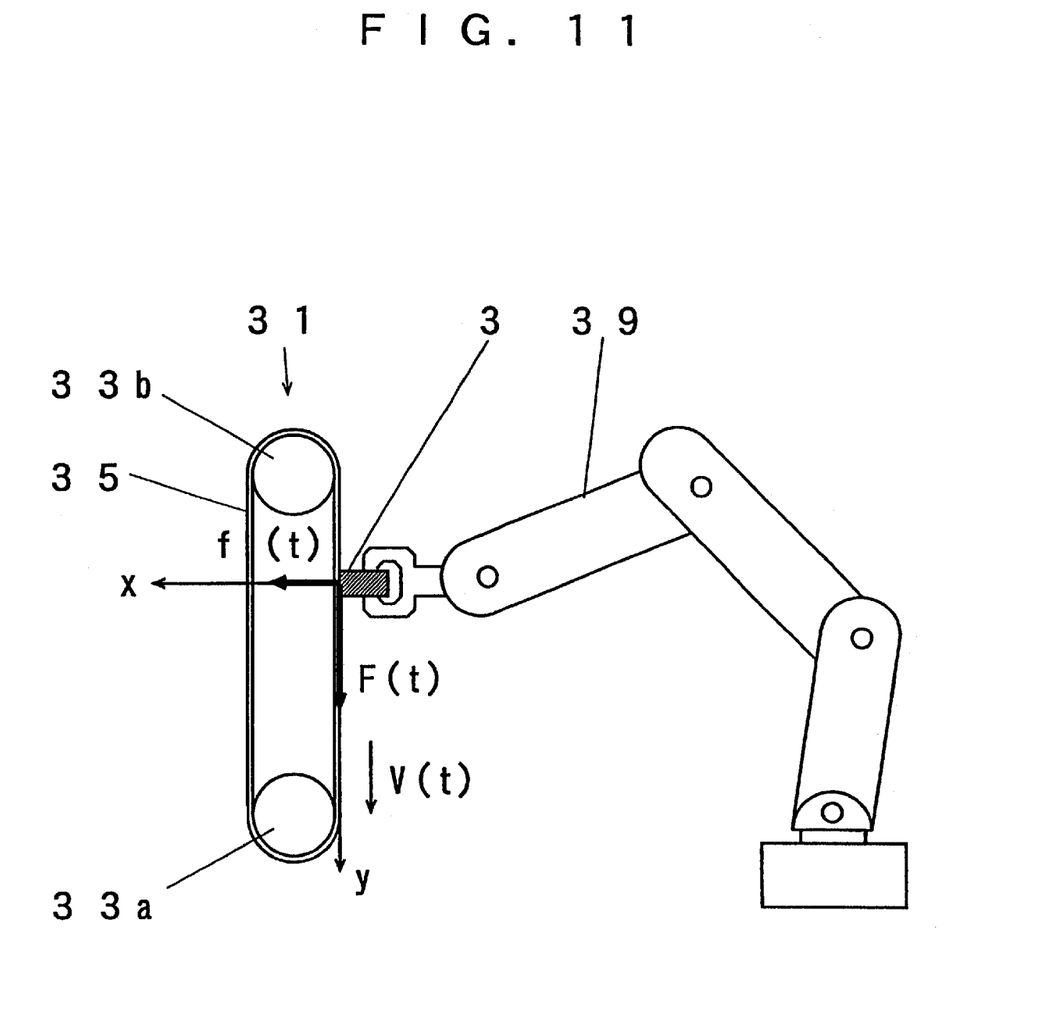
FIG. 11 is a structural view showing a grinding robot.

A conventional grinding robot is shown in FIG. 11. In FIG. 11, a grinding unit 31 is a rotary type grinding machine such as a PVA (polyvinyl alcohol) grinding stone or a buff grinding unit. A buff 35 is driven by drivers 33a and 33b. The workpiece 3 is held by a robot 39 and is depressed against the buff 35 by a force f(t) in a direction x to thereby grind a predetermined surface. The buff 35 is moved at a velocity V(t) in a direction y (where the velocity in the tangential direction of the buff 35 at a tangential point is defined at V(t)). In this case, t is the grinding time when the workpiece 3 is depressed to the buff 35. In this control, the force $f_{mx}(t)$ (not shown) in the direction x which is given to the workpiece 3 by the robot 39 is adjusted so that the force f(t) becomes a predetermined value.

However, in the conventional control, even in the case where clogging occurs in, for example, the buff 35 and the frictional force F(t) (which is the frictional force in the tangential direction at the tangential point of the outer circumference of the grinding unit 31) between the buff 35 and the workpiece 3 is reduced, the constant force f(t) is simply applied for a predetermined period of time. As a result, there is a concern that the grinding work is not sufficiently performed. In this control, ideally, it is necessary to increase the force f(t) corresponding to the decrement of the frictional force F(t) or to elongate the grinding time t. Namely, since the frictional coefficient between the buff 35 and the workpiece 3 is delicately changed in accordance with various conditions, it is not possible to perform stable grinding work in the control of the force $f_{mx}(t)$ in the direction x supervising the force f(t) in the direction x. On the other hand, the essence of the grinding work is in relation equal to the total amount of the energy given from the grinding unit 31 (hereinafter simply referred to a grinding energy). The reason why the control is used to increase the force f(t) or to elongate the grinding time t when the above-described clogging occurs is that it is necessary to keep constant the grinding energy. In order to obtain a high quality and stable ground surface without any adverse affect by a change in frictional coefficient, it is ideal to control the grinding energy by the robot 39.

SUMMARY OF THE INVENTION

In view of the forgoing conventional problems, an object of the present invention is to provide a CAD/CAM apparatus and a machining apparatus in which path data having position and force information or energy as attributes are calculated in accordance with a predetermined algorithm on the basis of shape information, machining information and machined surface information of a workpiece to thereby perform force control in addition to positional control so that high quality and stable shape precision and surface roughness control may be obtained.

In order to attain this and other objects, according to the present invention, a CAD/CAM apparatus utilizing force control information comprises a path data calculation means (15) for calculating path data having as an attribute at least one of a position, a force and an energy on the basis of shape information of a workpiece (3), machining information including a parameter needed for machining the workpiece (3) and machined surface information representing a state of a machined surface of the workpiece (3); and an operation planning calculation means (19) for calculating an operation plan of the path on the basis of the path data calculated by the path data calculation means (15).

The path data calculation means (15) calculates the path data having as an attribute at least one of a position, a force and an energy on the basis of shape information of the workpiece (3), machining information including a parameter needed for machining the workpiece (3) and machined surface information representing a state of a machined surface of the workpiece (3). In this case, there is used a machining method of the workpiece (3) such that the workpiece (3) or the tool is moved. Here, the path means the path of the tool or the workpiece (3). The operation planning calculation means (19) calculates an operation plan of the path on the basis of the path data calculated by the path data calculation means (15). Thus, in view of the machining information or the machined surface information in addition to the shape information of the workpiece (3), it is possible to calculate the operation plan of the path or to calculate the path data in a form emphasizing the surface roughness in addition to the shape precision when grinding or the like is performed.

Also, the path data calculation means (15) produces a predetermined function on the basis of an algorithm in which the skill of a skilled artisan is reflected with respect to at least one of the shape information, the machining information and the machined surface information of the workpiece (3), and calculates the path data on the basis of the function. In the path data calculation means (15), the algorithm which reflects the skill of the skilled artisan concerning the shape information, machining information and machined surface information of the workpiece (3) is produced. A predetermined function is produced on the basis of this algorithm. Thereafter, the position and/or force data are calculated and output on the basis of the function. Thus, the data of the position and/or force sought in the path data calculation means (15) may reflect the skill of the artisan and the skill of the artisan may thus be realized in a very effective manner.

Furthermore, according to the present invention, there are provided a grinding unit (31) for grinding a predetermined surface of the workpiece (3) at a tangential velocity V(t) and a robot (39) for pressing the workpiece (3) against the grinding unit (31) with a contact area A or for pressing the grinding unit (31) against the workpiece (3) fixed at a predetermined position in space, and it is characterized in that force control is performed so that the grinding energy needed for grinding the workpiece (3) becomes an energy having a value E(t) sought by the path data.

A total amount of the grinding energy needed for grinding the workpiece (3) given to the workpiece (3) by the robot (39) is under a one-to-one relation with the grinding amount. Accordingly, in order to keep constant the ground surface, it is necessary to control the grinding energy at a desired value predetermining the grinding energy. Thus, it is possible to obtain a ground surface with a high quality and stability without any adverse affect caused by a change of the frictional coefficient. Incidentally, in the force control, the workpiece (3) may be held by the robot (39) and the workpiece (3) may be pressed against the grinding unit or the grinding unit (31) is held by the robot (39) and the grinding unit (31) may be pressed to the workpiece (3) fixed in space.

DESCRIPTION DETAILED OF THE PREFERRED EMBODIMENTS

Figure 1:
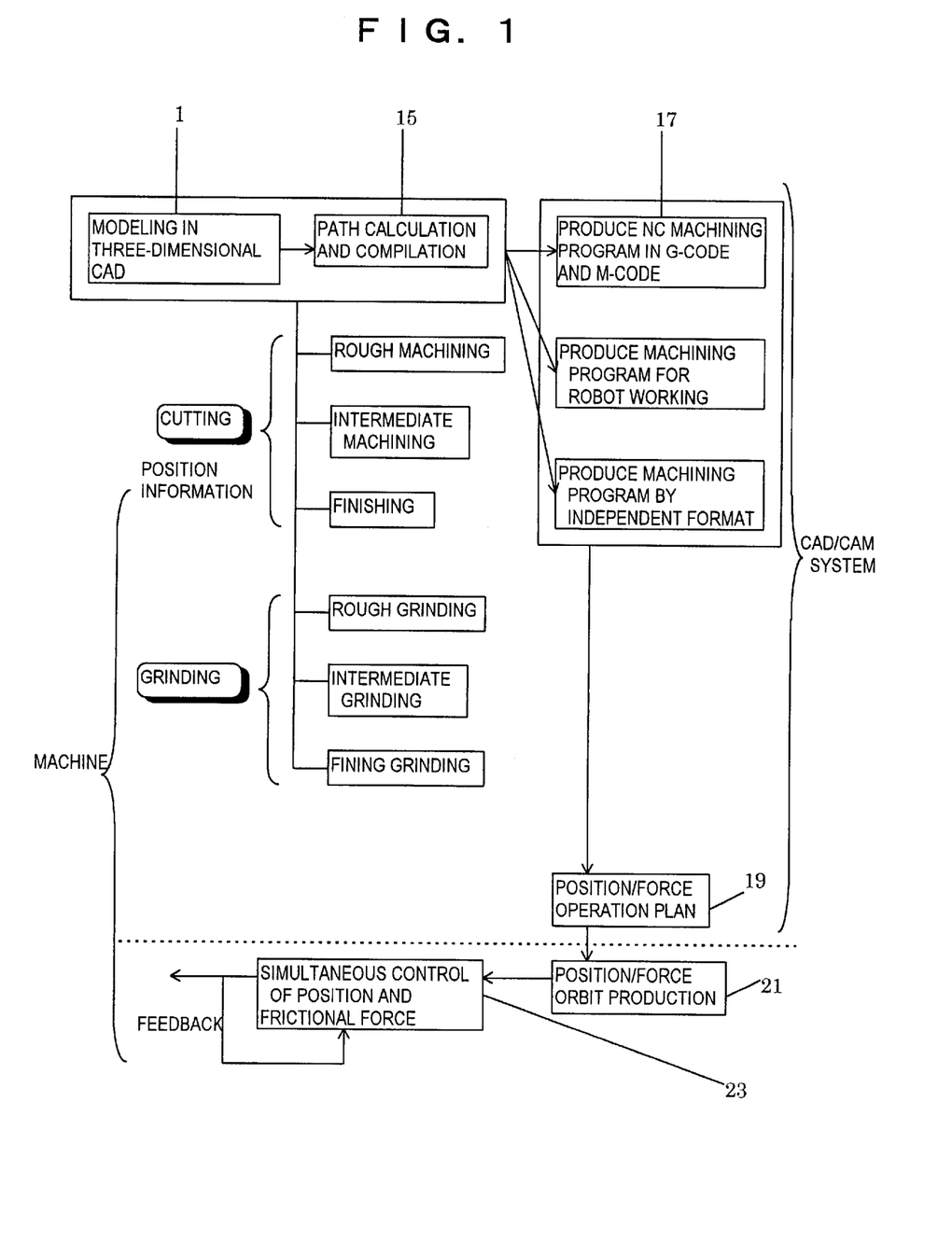
FIG. 1 is an overall structural view showing a CAM system for processing position/force information.

An embodiment of the present invention will now be described with reference to the accompanying drawings. FIG. 1 shows a CAM system for processing position and force information. Incidentally, the same reference numerals are used to indicate the same components as those shown in FIG. 9 and a duplicated explanation therefor will be omitted. In a path calculation section 15, path data having position and force information as an attribute is calculated by, for example, a fuzzy inference method from machined surfaced information and machining information given by the conditions between the workpiece 3 and the tool to be used and the shape information given by the CAD1. In the machining program producing section 17, the machining program is produced on the basis of the path data. In the position/force operation planning section 19, a target orbit concerning the force/moment is designed together with the position/posture target orbit as a cubic polynomial or a quintic polynomial so that the desired force/moment which is manually applied to the object in actual operation may be attained. The path calculation section 15, the machining program producing section 17 and the position/force operation planning section 19 constitute a CAM 2. Also, in a position/force orbit producing section 21, the orbit data for every renewal cycle Tm are calculated by using the polynomial obtained in the position/force operation planning section 19. In a controlling section 23, the position and the frictional force are simultaneously fed back on the basis of the orbit data obtained in the position/force orbit producing section 21.

The operation will now be described. A three-dimensional shape modeled by the CAD 1 is input into the path calculation section 15. Then, the three-dimensional shape is used for the operation plan of the position as the machining shape information. Also, the ground surface area of the workpiece 3 and the machining information such as the current surface roughness are given as the machined surface information by the parameter input.

The method as to how to determine the position/force information will now be described. The position/force information is processed by the fuzzy inference method on the basis of the machined surface information, the machining information and the machining shape information. First of all, as shown in Table 1, the fuzzy rule is produced concerning the items relating to the position/force.

TABLE 1

| grinding energy En | | ground surface area A | | |
|---|---|---|---|---|
| | | large | medium | small |
| current surface roughness - target | large | large (1) | large (2) | medium (3) |

TABLE 1-continued

|  | | ground surface area A | | |
|---|---|---|---|---|
| grinding energy En | | large | medium | small |
| surface roughness e | medium | large (4) | medium (5) | small (6) |
| | small | medium (7) | small (8) | small (9) |

Figure 2:
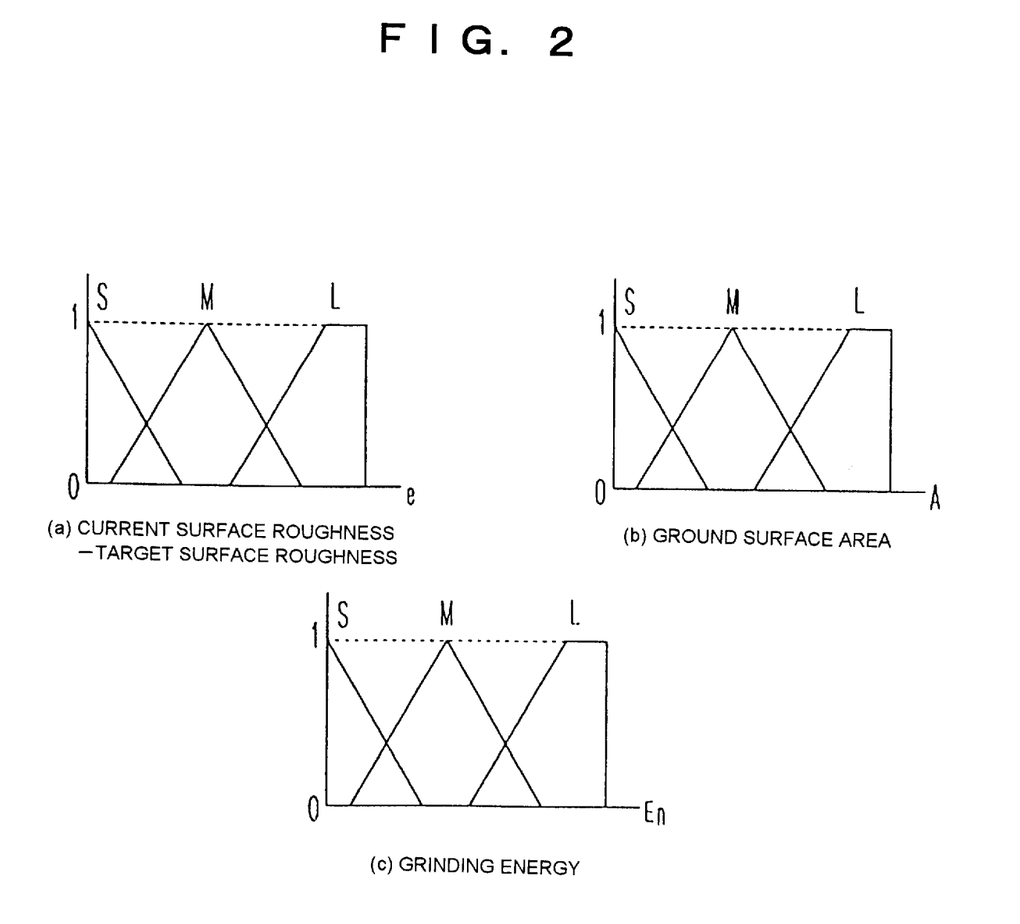
FIG. 2 is a view showing a membership function.

In accordance with the fuzzy rule, for example, if the difference between the target surface roughness and the current surface roughness is large and the ground surface area is large, the grinding energy (frictional force) is increased. The rule reflects a skill of a skilled artisan. In Table 1, the difference between the target surface roughness and the current surface roughness and the ground surface area are classified into three stages, respectively, and also the energy which is the evaluation item is classified into three stages. However, it is possible to perform the control in more detail by increasing the number of the stages. Then, subsequently, the membership function is produced on the basis of the fuzzy rule of Table 1. As shown in FIG. 2, the membership function representing the magnitudes, such as, "large", "medium" and "small" concerning the surface roughness difference e, the ground surface area A and the grinding energy En is produced. The ordinate represents the suitability, 0 means the unsuitability, and 1 represents very good suitability.

Figure 3:
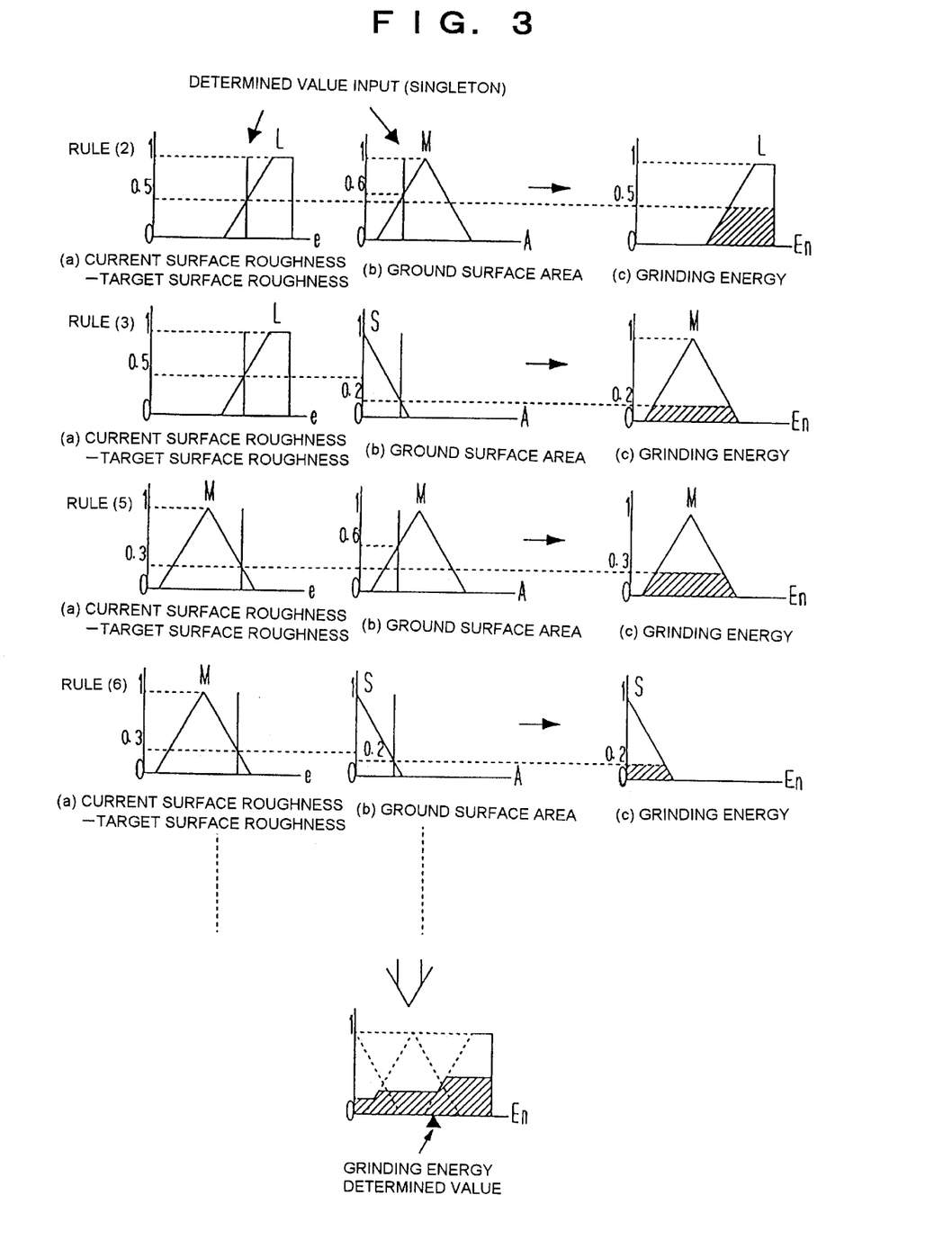
FIG. 3 is an illustration for illustrating a method of a fuzzy inference.

Calculation of the determined value by the fuzzy inference method will be explained. FIG. 3 shows graphs of the fuzzy inference method. In FIG. 3, when the determined value is calculated, first of all, the respective determined values are input with respect to the membership function of the surface roughness difference e and the ground surface area A. Subsequently, the degree of matching between the membership function of the ground surface area A and the surface roughness difference e with respect to the respective rule of (1) to (9) of Table 1 is searched, and the membership function of the grinding energy En is removed on the side of the smaller value. Then, the rest thereof is adopted to obtain the inference result. For example, with respect to rule (2), the suitability of the determined value input for the surface roughness difference e is 0.5. On the other hand, the suitability of the determined value input for the ground surface area A is 0.6. Accordingly, the value 0.5 that is the smaller value of the suitability is adopted as the suitability of the grinding energy En. Then, the membership function of the grinding energy En is removed by the suitability 0.5, and the rest thereof is adopted. In the same way, also with respect to the rules other than rule (2), the fuzzy inference is performed. However, in the rules other than those shown in FIG. 2, the matching degree is zero. Therefore, these cases are omitted. The calculated grinding energy En takes a logic sum over all the rules. Thereafter, the gravitational center position is sought for all the surface of the grinding energy En taking the logic sum. The gravitational center position is the determined value for the desired grinding energy. In the foregoing steps, the determined value is calculated with respect to the grinding energy. Also, in the same manner, the determined values may be calculated for the force or the moment. In the foregoing steps, the fuzzy inference is adopted as the algorithm. Calculation of the determined values, however, is not limited to this.

Figure 4:
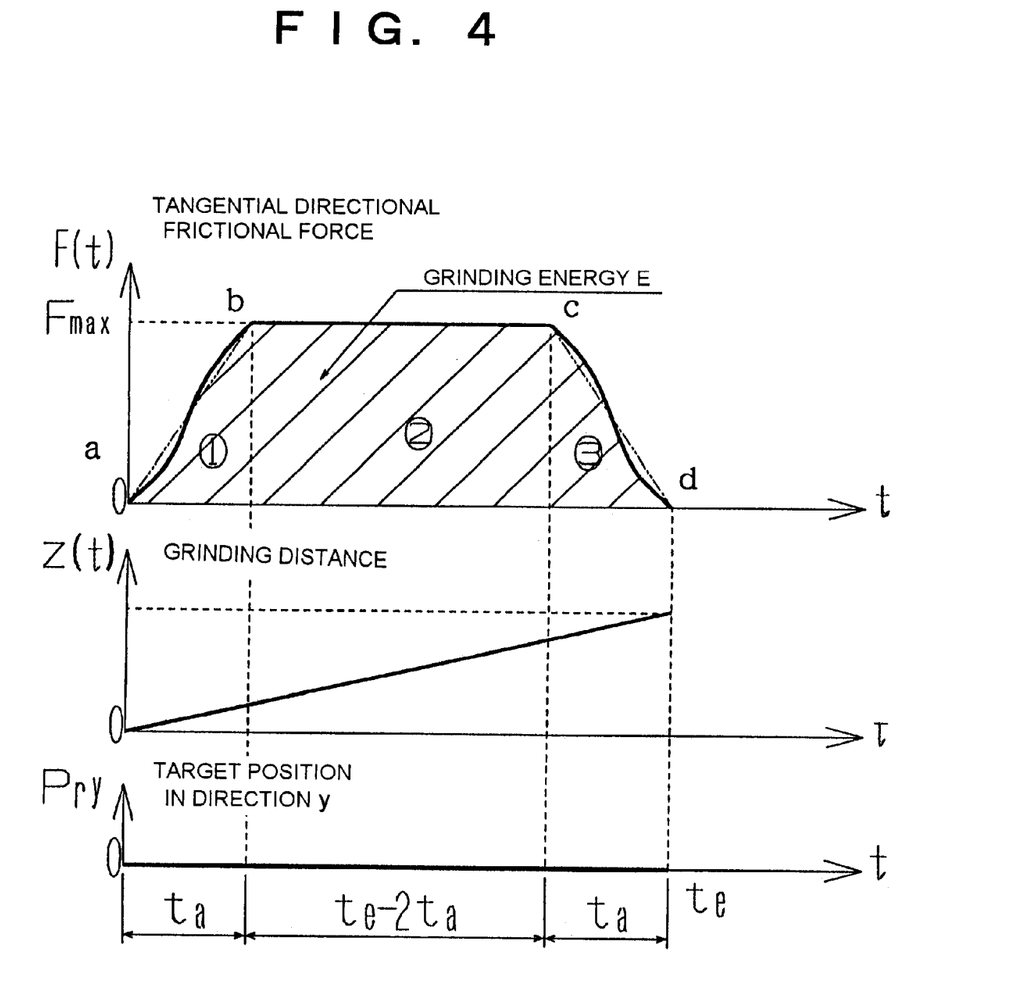
FIG. 4 is a view showing a grinding operation.
Figure 5:
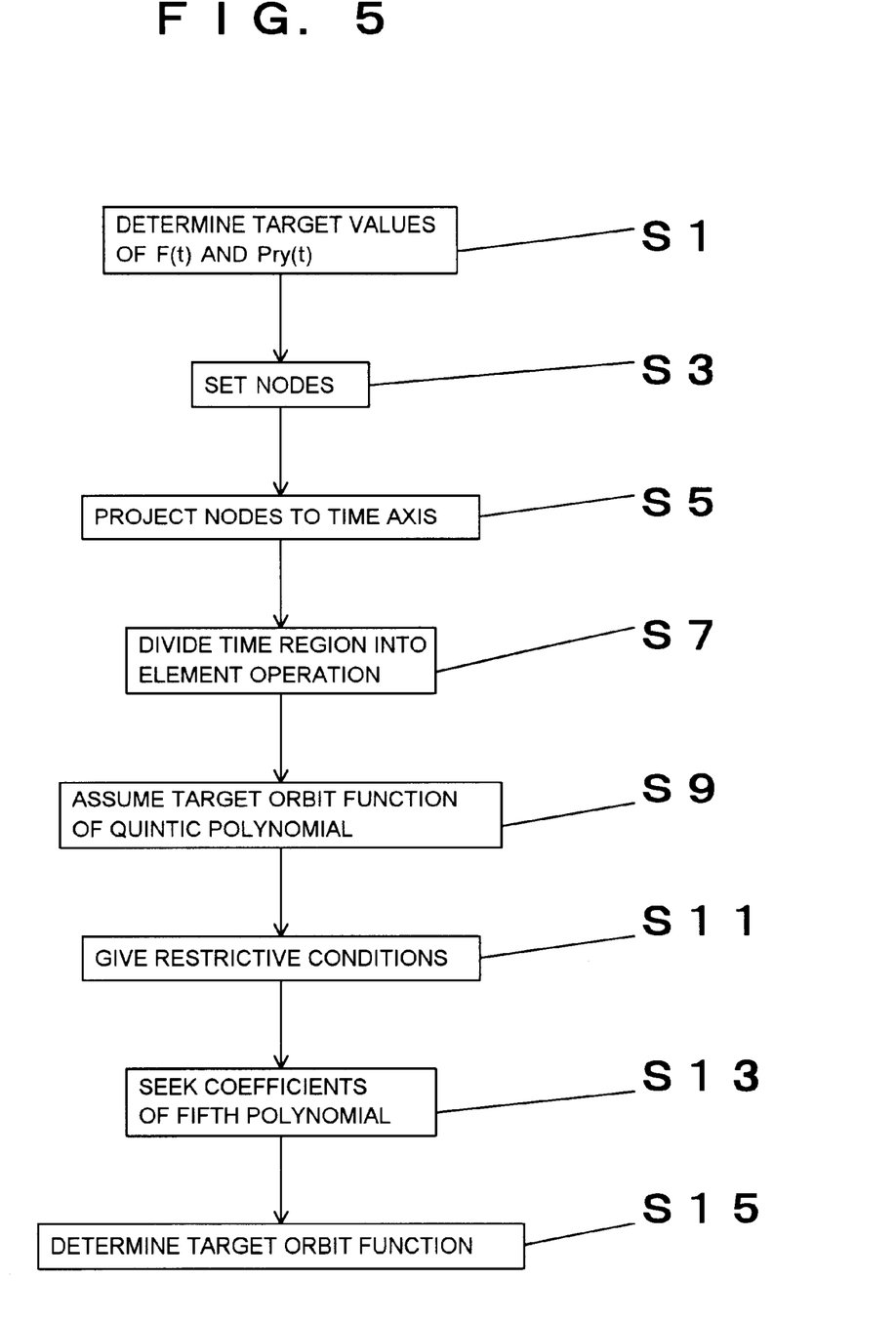
FIG. 5 is a flowchart showing design steps of the target orbit function.

Subsequently, the method used to produce the operation plan in the position/force operation planning section 19 will now be described. The position/force operation planning section 19 realizes the operation plan of the robot or the like for the hybrid control system of the position and the force. Namely, the target orbit concerning the force/moment is designed as a cubic polynomial or a quintic polynomial together with the position/posture target orbit to realize the desired force/moment that is manually applied to the object in the actual operation. As a result of the operation of the tool or the workpiece 3 for the grinding energy determined value given by the fuzzy inference, the frictional force F(t) is sought as the target orbit function on the basis of the following formula 1 so that the grinding energy E (t) becomes the grinding energy determined value.

$$E(t) = \frac{1}{A}\int_0^t F(t) \cdot V(t) dt \qquad \text{[formula 1]}$$

where V(t) is the velocity of the grinding unit or the tool on the contact surface. The design of the target orbit function concerning a robot will be described in detail with reference to FIGS. 4 and 5.

the method used to produce the orbit in the position/force orbit producing section 21 will now be described. In the position/force orbit producing section 21, the target orbit or the target position/posture data or the like is obtained by giving the target operation time to the determined target orbit function. The "orbit production" means a process for producing the target orbit data by using the target orbit function. The "target operation time" means a time t(k) (k=0, 1, 2, 3, 4, . . . ) for every renewal cycle Tm called a motion rate. The motion rate is generally set to an integer number of times the servo rate (control sampling time). In the controlling section 23, the simultaneous feedback control of the position and the frictional force is performed on the basis of the target position and posture data or the like given in the position/force orbit producing section 21.

Thus, the machining data such as the grinding, cutting and finishing with great account of the surface roughness are outputted to produce the operation plan or the orbit and control the working machine. Accordingly, it is possible to automatically perform the operation.

Incidentally, as described above, the path calculation section 15, the machining program producing section 17 and the position/force operation planning section 19 are formed independently of the CAD 1. Then, the path calculation section 15, the machining program producing section 17 and the position/force operation planning section 19 constitute the CAM 2. However, it is possible to incorporate into the software of the CAD 1 the path calculation section 15, the machining program producing section 17 and the position/force operation planning section 19.

The case where the above-described position/force operation planning section 19, position/force orbit producing section 21 and controlling section 23 are applied specifically to the robot will now be described.

The structure of the embodiment is the same as that shown in FIG. 11. The buff 35 is moved in the direction y at the tangential directional velocity V(t) (hereinafter simply referred to as a grinding velocity) by the grinding unit 31. The robot 39 presses the workpiece 3 to the buff 35 by the force f(t) in the direction x. In this case, if the contact area between the workpiece 3 and the buff 35 is represented by A, the grinding energy E(t) per unit area is given by the formula 1.

In particular, if F(t)=F and V(t)=V, it is given by formula (2):

$$E(t) = \frac{F \cdot V \cdot t}{A} = \frac{F \cdot z}{A}$$ [Formula 2]

$$z(t) = V \cdot t$$

where z(t) is the grinding distance. Also, the pressure force F(t) in the normal direction is given by formula (3):

$$F(t) = \alpha \cdot f(t)$$ [formula 3]

where α is the positive constant or variable determined by the grinding unit 31 and the workpiece 3. In order to control the grinding energy E(t), the tangential directional frictional force F(t) and the grinding velocity V(t) may be controlled. In this case, as is frequently performed in the conventional force control, even if the pressure force f(t) in the rotational direction is controlled, since there are some cases that the value of α is always changed by the workpiece 3 and the grinding unit 31, it is difficult to control E(t). Accordingly, in order to control E(t), it is necessary to directly control the frictional force F(t).

The control of the grinding energy E(t) on the basis of the formula 1 will now be described.

In the case where the workpiece 3 held by the robot is pressed against the grinding unit 31 as shown in FIG. 11 and the workpiece 3 is removed away from the grinding unit 31 when the grinding operation has been finished, the grinding operation (the force F(t), the grinding distance z(t) and the target position $P_{ry}$ (t) in the direction y at time t=0 to $t_e$) is shown in FIG. 4.

From the graph of F(t) shown in FIG. 4, the grinding energy $E(t_e)$ per unit area at $t=t_e$ is given by the formula 4. F(t) is divided into $F_1(t)$, $F_{max}$ and $F_3(t)$ in response to the regions ①, ③ and ③ in FIG. 4, respectively.

$$E(t_e) = \frac{V}{A}\left[\int_0^{t_a} F_1(t)dt + (t_e - 2t_a)F_{max} + \int_{t_e-t_a}^{t_e} F_3(t)dt\right]$$ [formula 4]

$$F(t) = \begin{cases} F_1(t) & 0 \le t < t_a \\ F_{max} & t_a \le t < t_e - t_a \\ F_3(t) & t_e - t_a \le t \le t_e \end{cases}$$

Figure 6:
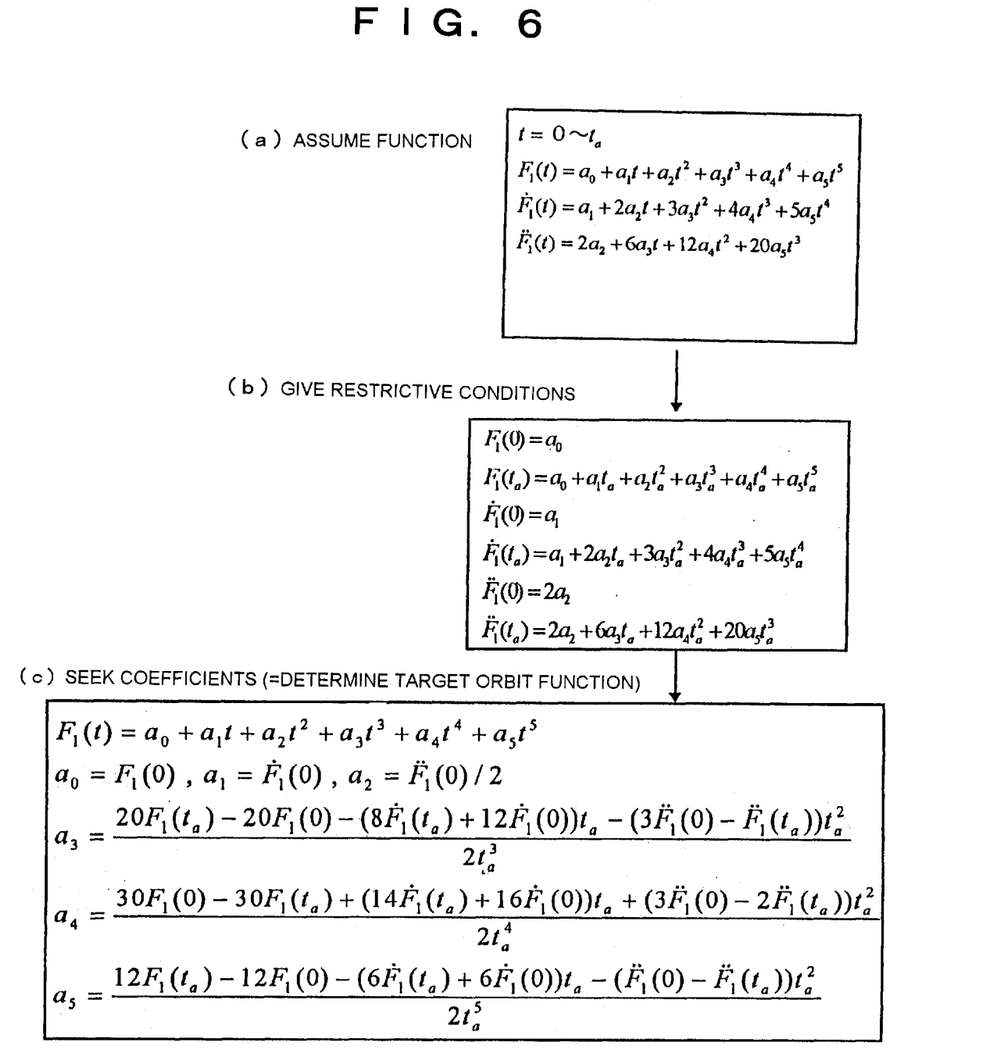
FIG. 6 is a view showing the design steps of the target orbit function.

The design of the target orbit function of the target position $P_{ry}(t)$ in the direction y and the frictional force $F_1(t)$ in the example shown in FIG. 4 is performed as follows. It will now be described with reference to a flowchart shown in FIG. 5. First of all, the target values of F(t) and $P_{ry}(t)$ are determined in step 1 (shown by S1 in FIG. 5, the following steps also shown in the same manner). In step S3, the target value is set as a node together with the time when the target value is applied. The node is determined for each degree of freedom of control. For example, in the graph of F(t) shown in FIG. 4, the nodes exist at an initial point (the point indicated by a, at t=0), a point where the region 1 and the region 2 are contiguous (the point indicated by b, at t=$t_a$), a point where the region 2 and the region 3 are contiguous (the point indicated by c, at t=$t_e-t_a$) and a final point (the point indicated by d, at t=$t_e$). On the other hand, the nodes of the target position $P_{ry}(t)$ are the initial point (t=0) and the final point (t=$t_e$). Then, in step S5, the node is projected to the time axis. The projected node is represented as the logic sum for each degree of freedom of control. As a result, in step S7, the time region is divided by the same number as that of the nodes. The minimum unit of operation in the divided time region is regarded as an "element operation". Subsequently, the target orbit function in the element operation is designed. The target orbit function is designed as the quintic polynomial as shown in FIG. 6(a) but it is possible to design it as the cubic polynomial. In case of the quintic polynomial, in step 9, three functions are assumed. One function corresponds to a first differentiation of another function. Subsequently, in step S11, the restrictive conditions are given to the three functions. The number of the restrictive conditions is six as shown in FIG. 6(b) (initial value, initial value of first differentiation, initial value of second differentiation, final value, final value of first differentiation and final value of second differentiation). It is therefore possible to obtain each coefficient of the target orbit function in step S13. Accordingly, in step S15, it is possible to determine the target orbit function as shown in FIG. 6(c). Thus, the restrictive conditions that are to be boundary are given and the target orbit function is solved so that the target orbit of the frictional force $F_1(t)$ and the target position $P_{ry}(t)$ may be smoothly connected as shown in FIG. 4. Accordingly, there is no shock and also there is none of residual vibration or deformation or damage or the like. If the quintic polynomial is designed, it is possible to realize the function more similar to the human operation than the cubic polynomial.

Also, in $F_3(t)$, the formula 5 is established.

$$F_3(t) = F_1(t_e - t)$$ [formula 5]

Accordingly, each coefficient of $F_3(t)$ is given by the formula 6:

$$F_3(t) = F_1(t_e - t)$$ [formula 6]

$$= a_0 + a_1(t_e - t) + a_2(t_e - t)^2 + a_3(t_e - t)^3 +$$

$$a_4(t_e - t)^4 + a_5(t_e - t)^5$$

$$a_0 = F_1(0), \; a_1 = \dot{F}_1(0), \; a_2 = \ddot{F}_1(0)/2$$

$$a_3 = \frac{20F_1(t_a) - 20F_1(0) - (8\dot{F}_1(t_a) + 12\dot{F}_1(0))t_a - (3\ddot{F}_1(0) - \ddot{F}_1(t_a))t_a^2}{2t_a^3}$$

$$a_4 = \frac{30F_1(0) - 30F_1(t_a) + (14\dot{F}_1(t_a) + 16\dot{F}_1(0))t_a + (3\ddot{F}_1(0) - 2\ddot{F}_1(t_a))t_a^2}{2t_a^4}$$

$$a_5 = \frac{12F_1(t_a) - 12F_1(0) - (6\dot{F}_1(t_a) + 6\dot{F}_1(0))t_a - (\ddot{F}_1(0) - \ddot{F}_1(t_a))t_a^2}{2t_a^5}$$

Figure 7:
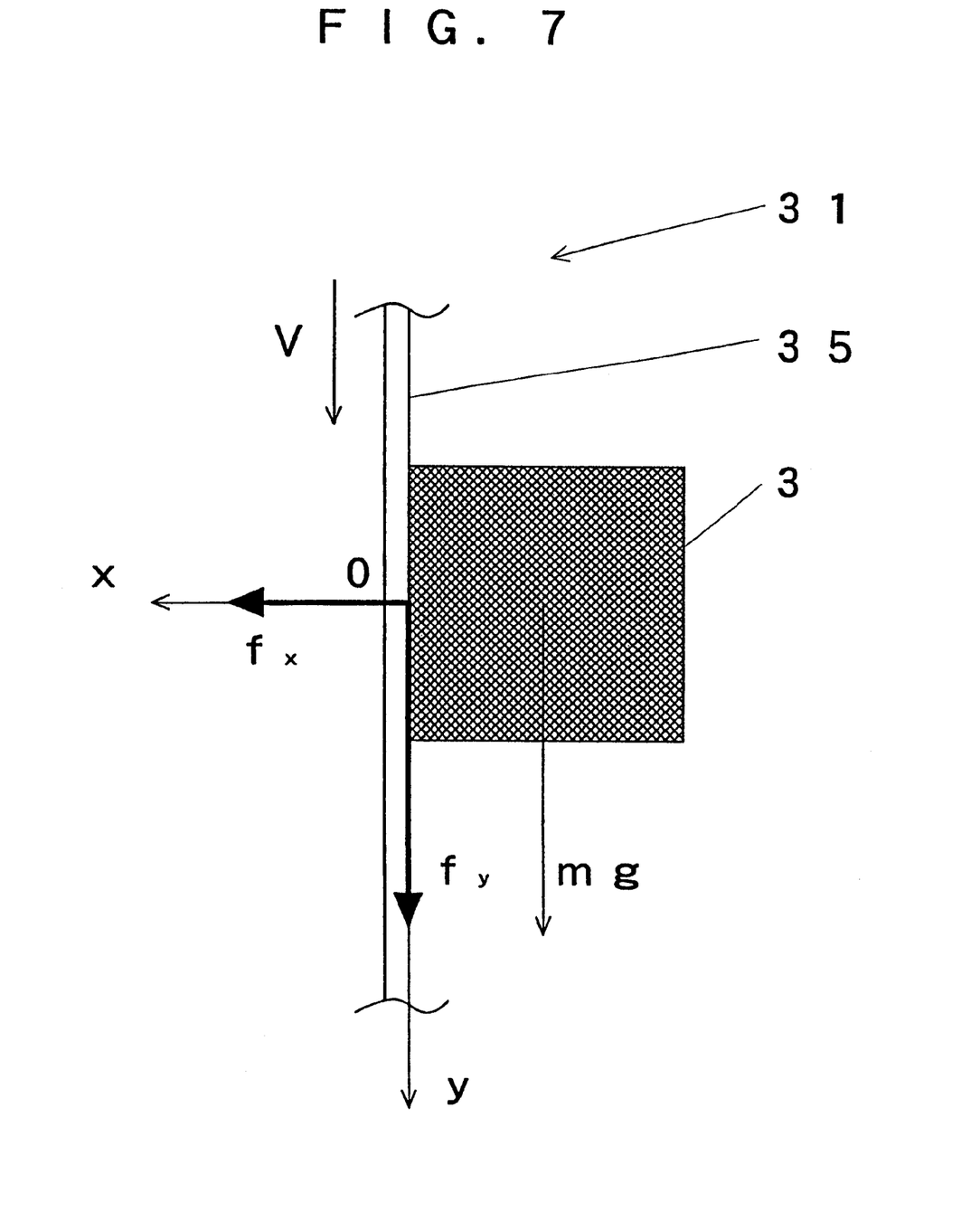
FIG. 7 is a view showing a grinding energy control system model.

The structure of the grinding energy control system will now be described. The control system model is shown in FIG. 7. In FIG. 7, the control on the robotic side in the case where the robot 39 (not shown in FIG. 7) presses the workpiece 3 having a mass m against the grinding unit 31 having the elastic coefficient k will be described. In this case, assume that PX is the position in the direction x, $P_y$ is the position in the direction y, $f_x$ is the force given in the direction x by the grinding unit 31, $f_y$ is the frictional force in the direction y, $f_{mx}$ is the drive force given in the direction x by the robot 39, $f_{my}$ is the drive force given in the direction y by the robot 39 and $P_{ry}$ is the target value for the direction y of the workpiece 3. The respective equations of motion in the directions x and y are given by formula 7:

$$m \cdot \ddot{P}_x + k \cdot P_x = f_{mx}$$
$$m \cdot \ddot{P}_x + f_y = f_{my} + mg$$
$$f_x = k \cdot P_x$$
$$f_y = a \cdot f_x = a \cdot k \cdot P_x \qquad \text{[formula 7]}$$

Figure 8:
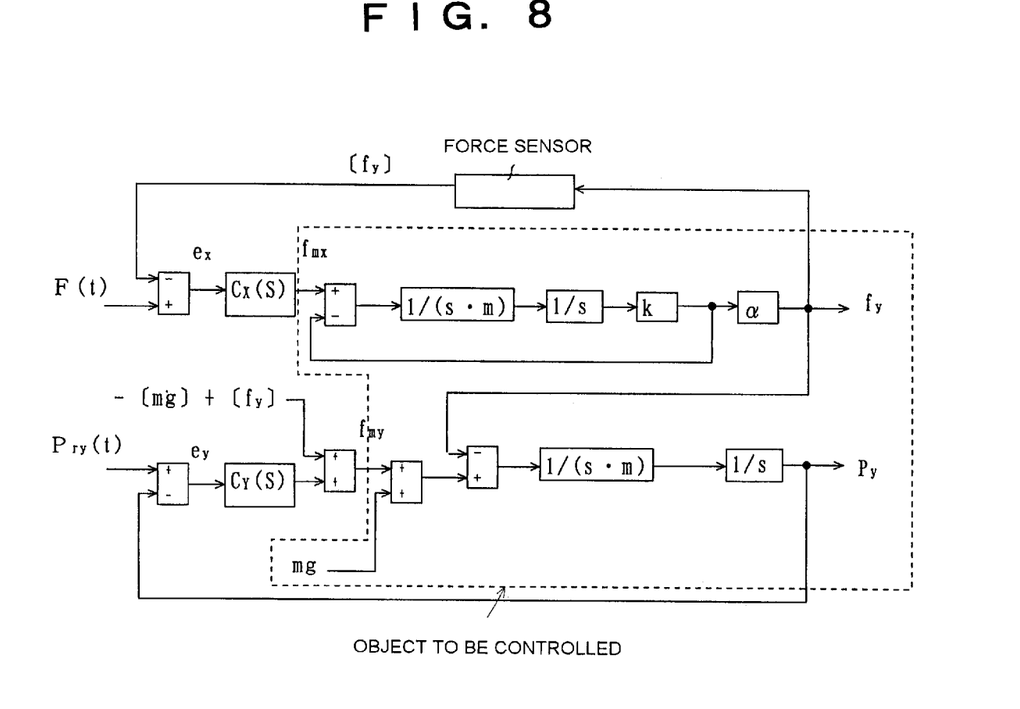
FIG. 8 is a view showing an example of a block diagram.

In the control specification, the position $P_y$ of the work is controlled to the target value $P_{ry}$ during time t=0 to $t_e$. Accordingly, $P_y = P_{ry}(e_y = 0$ when $e_y = P_{ry} - P_y)$ is established. also, the frictional force $f_y$ is controlled so as to be identified with the tangential directional friction target value F(t). Accordingly, $f_y = F(t)$ is established. A block diagram showing an example of the control for realizing the control specification is shown in FIG. 8. In this case, mg is the gravity calculation value and the $f_y$ is the force sensor detection value. The system is designed so that a compensator is constituted by $C_x(s)$, $C_y(s)$ and an assistant input $(mg+f_y)$ whereby a closed loop system is stabilized. The structure of the compensator may be based upon a classic control logic such as a PID control or the like or may be based upon a current control/robust control theory.

Incidentally, it is possible to operate with PID design or the like of $C_y(s)$ without inputting [mg] or -[mg]+[$f_y$]. However, it is difficult to perform a delicate setup applied to the grinding corresponding to the fact that the control load becomes heavy.

As described above, according to the present invention, the path data having the positional information, the force information and the energy as attributes are calculated by the predetermined algorithm on the basis of the shape information, machining information machined surface information of the workpiece. Accordingly, force control may be performed in addition to positional control to thereby perform machining of high quality and stable shape precision and surface roughness.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A CAD/CAM apparatus for producing machining information accounting for force information, comprising:
   path data calculation means for calculating path data used for calculating a machining path for machining of a workpiece by a machine, the path data having as attributes a position of the workpiece with respect to the machine used for machining the workpiece and at least one of a force and an energy applied to one of the machine and the workpiece during machining of the workpiece, the path data being calculated in accordance with shape information of the workpiece, machining information including a parameter needed for machining the workpiece and machined surface information representing a surface roughness of a surface of the workpiece to be machined; and
   operation planning calculation means for calculating an operation plan of the path of the workpiece or the machine wherein the calculated operation plan is used to machine the workpiece on the basis of the path data calculated by the path data calculation means.

2. A CAD/CAM apparatus according to claim 1; further comprising one of a two- or three-dimensional CAD system for generating the shape information of the workpiece.

3. A CAD/CAM apparatus according to either one of claims 1 and 2; wherein the path data calculation means includes means for producing a predetermined function on the basis of an algorithm in which the level of skill of a skilled artisan is reflected with respect to at least one of the shape information, the machining information and the machined surface information of the workpiece, and for calculating the path data on the basis of the predetermined function.

4. A CAD/CAM apparatus according to claim 3; wherein the algorithm performs a fuzzy inference method, the predetermined function comprises a membership function, and the path data includes data based on at least one of a position, a posture, a force and a moment.

5. A CAD/CAM apparatus according to either one of claims 1 and 2; wherein the operation planning calculation means includes means for setting the operation plan for at least one of the position and the force during machining of the workpiece in order to traverse the calculated path smoothly based on the path data calculated by the path data calculation means.

6. A machining apparatus for producing machining information accounting for force information, comprising:
   path data calculation means for calculating path data used for calculating a machining path for machining of a workpiece by a machine, the path data having as attributes a position of the workpiece with respect to the machine used for machining the workpiece and at least one of a force and an energy applied to one of the machine and the workpiece during machining of the workpiece, the path data being calculated in accordance with shape information of the workpiece, machining information including a parameter needed for machining the workpiece and machined surface information representing a surface roughness of a surface of the workpiece to be machined;
   operation planning calculation means for calculating an operation plan of the path of one of the workpiece and the machine used to machine the workpiece on the basis of the path data calculated by the path data calculation means;
   position and/or force orbit producing means for calculating target orbit producing data for a predetermined cycle of at least one of the position and the force on the basis of the operation plan calculated by the operation planning calculation means; and
   controlling means for feedback controlling at least one of the position and the force of the workpiece with respect to the machine on the basis of the target orbit producing data calculated by the position and/or force orbit producing means.

7. A machining apparatus according to claim 6; further comprising a grinding unit for grinding a predetermined surface of the workpiece at a tangential velocity; and a robot for pressing one of the workpiece and the grinding unit against the other with a desired contact area; wherein force control is performed between the workpiece and the grinding unit so that a grinding energy used for grinding the workpiece becomes an energy having a value specified by the path data.

8. A machining apparatus according to claim 7 wherein the controlling means compares a force generated at a portion of the workpiece which is in contact with the grinding unit with force data calculated by the position and/or force orbit producing means and adjusts a force generated by the robot between the workpiece and the grinding unit on the basis of the difference between the generated force and the force data.

9. A machining apparatus according to claim 7; wherein the controlling means compares an actual position in a tangential direction of the workpiece or the grinding unit with position data calculated by the position and/or force orbit producing means and adjusts a forces in the tangential direction of the robot on the basis of the difference between the actual position and the position data.

10. A machining apparatus according to claim 9; wherein adjustment of the position is calculated by excluding the influence of at least one of a generated force and an effect of gravity on the workpiece and the grinding unit.

11. A machining apparatus for producing machining information accounting for force information according to any one of claims 8, 9 and 10; further comprising position and/or force target orbit producing means for producing a designated force value or a designated position value by producing, as a smooth time function, a plurality of target values based on position, posture, force and moment values supplied to a force control system, for a force control system having a degree of freedom for a plurality of factors of the position, posture, force and moment, the position and/or force target orbit producing means comprising node setting means for setting the target values as a designated value of the position, the posture, the force and the moment at a time representative of the plurality of operations, time region dividing means for dividing a time region by projecting nodes defined by the node setting means to a time axis as a logic sum of a degree of freedom of the control, and element operation designating means for calculating the target orbit function composed of a cubic or quintic polynomial while giving a boundary condition for every time region divided by the time region dividing means.

12. A CAD/CAM apparatus for producing machining information accounting for a force to be applied to a workpiece during machining thereof, comprising: path data calculation means for calculating path data used for determining a machining path for machining of the workpiece by a machine based on information relating to the shape of the workpiece, machining information including one or more parameters needed for machining the workpiece and machined surface information representing a surface roughness of a surface of the workpiece to be machined, the path data including positioning data for positioning of the machine with respect to the workpiece during machining of the workpiece and at least one of force data and a energy data representing a force or an energy to be applied to the workpiece during machining thereof; and operation planning calculation means for calculating an operation plan of the path of the workpiece or the machine wherein the calculated operation plan is used to machine the workpiece on the basis of the path data calculated by the path data calculation means.

13. A CAD/CAM apparatus according to claim 12; further comprising one of a two- or three-dimensional CAD system for generating the shape information of the workpiece.

14. A CAD/CAM apparatus according to claim 12; wherein the path data calculation means includes means for producing a predetermined function on the basis of an algorithm reflecting the level of skill of a skilled artisan with respect to at least one of the shape information, the machining information and the machined surface information of the workpiece, and for calculating the path data on the basis of the predetermined function.

15. A CAD/CAM apparatus according to claim 14; wherein the algorithm performs a fuzzy inference method, the predetermined function comprises a membership function, and the path data includes data based on at least one of a position, a posture, a force and a moment.

16. A CAD/CAM apparatus according to claim 12; wherein the operation planning calculation means includes means for setting the operation plan for at least one of the position and the force during machining of the workpiece in order to traverse the path smoothly based on the path data calculated by the path data calculation means.

17. In a method of machining a workpiece, the combination of steps comprising:

calculating path data used for determining a machining path for machining of the workpiece by a machine, based on information relating to the shape of the workpiece, machining information including one or more parameters needed for machining the workpiece and machined surface information representing a surface roughness of a surface of the workpiece to be machined, the path data including positioning data for positioning of the machine with respect to the workpiece during machining of the workpiece and at least one of force data and a energy data representing a force or an energy to be applied to the workpiece during machining thereof; and calculating an operation plan of the path of the workpiece or the machine wherein the calculated operation plan is used to machine the workpiece on the basis of the calculated path data.

18. A method according to claim 17; further comprising the step of determining the information relating to the shape of the workpiece using one of a two- or three-dimensional CAD system.

19. A method according to claim 17; wherein the step of calculating the path data includes the steps of producing a predetermined function on the basis of a level of skill of a skilled artisan with respect to at least one of the information relating to the shape of the workpiece, the machining information and the machined surface information of the workpiece; and calculating the path data on the basis of the predetermined function.

20. A method according to claim 19; wherein the step of producing the predetermined function includes the step of performing a fuzzy inference method.

21. A method according to claim 20; wherein the predetermined function comprises a membership function, and the path data includes data based on at least one of a position, a posture, a force and a moment.

22. A method according to claim 17; wherein the step of calculating an operation plan comprises the steps of setting the operation plan for at least one of the position and the force during machining of the workpiece in order to traverse the path smoothly based on the calculated path data.

* * * * *